US011858130B2

(12) United States Patent
Yihua et al.

(10) Patent No.: US 11,858,130 B2
(45) Date of Patent: Jan. 2, 2024

(54) CONTROLLER OF ROBOT FOR PERFORMING MANUAL OPERATION BY OPERATION DEVICE

(71) Applicant: Fanuc Corporation, Yamanashi (JP)

(72) Inventors: Gu Yihua, Yamanashi (JP); Takashi Satou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 151 days.

(21) Appl. No.: 16/701,837

(22) Filed: Dec. 3, 2019

(65) Prior Publication Data
US 2020/0180143 A1 Jun. 11, 2020

(30) Foreign Application Priority Data
Dec. 7, 2018 (JP) .................... 2018-230022

(51) Int. Cl.
*B25J 9/06* (2006.01)
*B25J 9/00* (2006.01)
*B25J 13/06* (2006.01)
*B25J 9/16* (2006.01)

(52) U.S. Cl.
CPC .......... *B25J 9/0081* (2013.01); *B25J 9/1633* (2013.01); *B25J 9/1664* (2013.01); *B25J 13/06* (2013.01)

(58) Field of Classification Search
CPC ...... B25J 9/0081; B25J 9/1633; B25J 9/1664; B25J 13/06; G05B 19/425
See application file for complete search history.

(56) References Cited

U.S. PATENT DOCUMENTS

| 6,212,443 | B1 | 4/2001 | Nagata et al. | |
|---|---|---|---|---|
| 8,412,379 | B2 | 4/2013 | Gerio et al. | |
| 10,350,768 | B2 | 7/2019 | Takeuchi | |
| 2011/0015787 | A1* | 1/2011 | Tsusaka | G05B 19/423 901/4 |
| 2016/0078583 | A1* | 3/2016 | Nishitani | H04N 23/661 348/207.1 |
| 2016/0368141 | A1* | 12/2016 | Touma | B25J 13/08 |
| 2017/0021500 | A1* | 1/2017 | Davis | B25J 9/1697 |
| 2017/0028557 | A1* | 2/2017 | Battisti | B25J 9/1684 |

(Continued)

FOREIGN PATENT DOCUMENTS

| CN | 102354153 A | 2/2012 |
|---|---|---|
| DE | 69622572 T2 | 4/2003 |
| DE | 102009041946 A1 | 3/2011 |

(Continued)

*Primary Examiner* — Khoi H Tran
*Assistant Examiner* — Aaron G Cain
(74) *Attorney, Agent, or Firm* — RatnerPrestia (57) ABSTRACT

A controller of a robot includes an operation device for an operator to perform an operation of manually changing a position and an orientation of the robot. The operation device includes a movable part configured to perform a pushing operation, a pulling operation, and a tilting operation in a predetermined direction, and an operation detection unit configured to detect the operation of the movable part. The processing device includes a manual control unit that controls an inching operation that changes the position and the orientation of the robot by a predetermined minute amount. The manual control unit determines whether or not the inching operation is performed based on the magnitude of the force with which the movable part is operated.

5 Claims, 7 Drawing Sheets

(56) References Cited

U.S. PATENT DOCUMENTS

2018/0099408 A1\* 4/2018 Shibata .................. B25J 9/1674
2018/0272534 A1   9/2018 Battisti

FOREIGN PATENT DOCUMENTS

| EP | 2194434 B1 | 5/2012 |
|----|------------|--------|
| EP | 3192449 A1 | 7/2017 |
| JP | 60200316 A | 10/1985 |
| JP | 63273909 A | 11/1988 |
| JP | H04-008190 A | 1/1992 |
| JP | 04051302 A | 2/1992 |
| JP | 05237784 A | 9/1993 |
| JP | H06-262403 A | 9/1994 |
| JP | H08-216074 A | 8/1996 |
| JP | 08336785 A | 12/1996 |
| JP | H09-230917 A | 9/1997 |
| JP | 10202568 A | 8/1998 |
| JP | H10-230489 A | 9/1998 |
| JP | H11-000882 A | 1/1999 |
| JP | 11262884 A | 9/1999 |
| JP | 2010149273 A | 7/2010 |
| JP | 2010-269418 A | 12/2010 |
| JP | 2014-184494 A | 10/2014 |
| JP | 5637883 B2 | 12/2014 |
| JP | 2015-182142 A | 10/2015 |
| JP | 2015217477 A | 12/2015 |
| JP | 2016-000439 A | 1/2016 |
| JP | 2016-221653 A | 12/2016 |
| JP | 2017164876 A | 9/2017 |
| JP | 2017-177293 A | 10/2017 |
| WO | 2017/064851 A1 | 4/2017 |

\* cited by examiner

CONTROLLER OF ROBOT FOR PERFORMING MANUAL OPERATION BY OPERATION DEVICE

CROSS-REFERENCE TO RELATED APPLICATIONS

This application is a new U.S. Patent Application that claims benefit of Japanese Patent Application No. 2018-230022, dated Dec. 7, 2018, the disclosure of this application is being incorporated herein by reference in its entirety for all purposes.

BACKGROUND OF THE INVENTION

1. Field of the Invention

The present invention relates to a controller of a robot for performing manual operation by an operation device.

2. Description of the Related Art

In the related art, a method is known in which an operator specifies a teaching point of a robot when creating a robot operation program. The operator manually drives the robot so as to determine a position and an orientation of a working tool relative to a workpiece. Furthermore, information that includes the position and the orientation of the robot at this time can be stored as the teaching point in the controller. The operator sets a plurality of teaching points according to an operation of the robot. The controller can, for example, generate an operation program such that a tool center point passes the teaching point or a vicinity of the teaching point. Further, the controller can create an operation program so that, at the teaching point, the orientation of the robot becomes the orientation specified by the operator.

As a method of driving a robot in order to set the teaching point, it is known that the operator drives the robot by pressing a button arranged on a teach pendant (see, e.g., Japanese Unexamined Patent Publication No. 2016-439A). The operator can drive the robot along a coordinate axis of a predetermined coordinate system.

In addition, when teaching a teaching point, a method is known in which an operator changes the position and orientation of a robot by moving an operation handle attached to the robot. This teaching method is referred to as a direct teaching method. A force sensor is attached to the operation handle or the robot. The controller detects a direction of the operation of the operation handle by the force sensor so as to drive the robot. As described above, control for changing the position and the orientation of the robot in response to the operation of the operation handle by the operator is known (see, e.g., Japanese Unexamined Patent Publication No. 2015-182142A, Japanese Unexamined Patent Publication No. 2017-177293A, Japanese Unexamined Patent Publication No. H8-216074A, Japanese Unexamined Patent Publication No. H10-230489A, and International Publication No. WO 2017/064851A1).

Alternatively, it is known that the operation device for operating the robot is attached to the robot or the like (see, e.g., Japanese Unexamined Patent Publication No. 2010-269418A, Japanese Patent No. 5637883B, and Japanese Unexamined Patent Publication No. H11-882A). An operator can move the robot to a desired position and orientation by operating the operation device.

In addition, control for displaying a robot movement path on a display device is known (see, for example, Japanese Unexamined Patent Publication No. 2016-221653A and Japanese Unexamined Patent Publication No. H9-230917A).

SUMMARY OF THE INVENTION

When an operator sets a teaching point by using a teach pendant or the like, a position and an orientation of a robot may be significantly moved. Such an operation is referred to as a jog operation. A positive side button and a negative side button for driving the robot along a predetermined coordinate axis are arranged on the teach pendant. When performing a jog operation, the operator presses the button continuously, whereby the position and the orientation of the robot can be changed along the coordinate axis.

On the other hand, in order to set the teaching points, there may be a case where the operator wants to change the position and the orientation of the robot slightly. For example, in the vicinity of a desired position, the position and the orientation of the robot may be finely adjusted. The controller of the robot can be formed so that an inching operation can be performed that slightly changes the position and the orientation of the robot. The operator switches to a mode that performs the inching operation. Then, the operator can slightly change the position and the orientation of the robot along each coordinate axis by pressing a button on the coordinate axis of the teach pendant.

However, in the related technology, when performing an inching operation, the robot cannot be driven in a direction other than the direction along the predetermined coordinate axis, leading to a problem of poor operability. Also, the operator needs to look at the teach pendant every time the operation is performed in order to confirm the position of the button on the teach pendant.

Also, when the operator accidentally touches the button, the robot may drive along the drive axis corresponding to the button. Alternatively, a movement amount when performing the inching operation is a length along the coordinate axis. The operator calculates the length along the coordinate axis when changing the movement amount. Then, the operator needs to operate the button on the teach pendant so as to change the movement amount. In this way, in the related controller, there is a problem that the operability at the time of performing the inching operation is poor. As a result, there is a problem that it takes a long time until the robot reaches a target position and orientation.

A controller of a robot in a first aspect of the present disclosure includes an operation device for an operator to perform an operation of manually changing a position and an orientation of a robot, and a processing device configured to process a signal from the operation device. The operation device includes a movable part configured to perform a pushing operation, a pulling operation, and a tilting operation in a predetermined direction, and an operation detection unit configured to detect the operation of the movable part. The processing device includes a manual control unit configured to control an inching operation that changes the position and the orientation of the robot by a predetermined minute amount in response to an operation of the movable part detected by the operation detection unit. The manual control unit includes a force detection unit configured to detect, based on an output of the operation detection unit, a magnitude of a force with which the movable part is operated. The manual control unit determines whether or not the inching operation is performed based on the magnitude of the force with which the movable part is operated.

A controller of a robot in a second aspect of the present disclosure includes an operation device for an operator to perform an operation of manually changing a position and an orientation of a robot, and a processing device configured to process a signal from the operation device. The operation device includes a movable part configured to perform a pushing operation, a pulling operation, and a tilting operation in a predetermined direction, and an operation detection unit configured to detect the operation of the movable part. The processing device includes a manual control unit configured to control an inching operation that changes the position and the orientation of the robot by a predetermined minute amount in response to an operation of the movable part detected by the operation detection unit, and a storage unit that stores information regarding manual operation. A setting direction in which the working tool attached to the robot moves is predetermined and stored in the storage unit. Regardless of a type of operation of the movable part, the manual control unit performs the inching operation so that the working tool moves in the setting direction when the movable part is operated.

A controller of a robot in a third aspect of the present disclosure includes an operation device for an operator to perform an operation of manually changing a position and an orientation of a robot, and a processing device configured to process a signal from the operation device. The operation device includes a movable part configured to perform a pushing operation, a pulling operation, and a tilting operation in a predetermined direction, and an operation detection unit configured to detect the operation of the movable part. The processing device includes a manual control unit configured to control an inching operation that changes the position and the orientation of the robot by a predetermined minute amount in response to an operation of the movable part detected by the operation detection unit, and a storage unit that stores information regarding manual operation. A curved movement path along which a working tool attached to a robot moves and a movement length along the movement path in a single inching operation are predetermined and stored in the storage unit. The manual control unit performs the inching operation so that the working tool moves along the movement path by the movement length when the movable part is operated.

DETAILED DESCRIPTION

A controller of a robot according to the embodiment will be described with reference to FIG. 1 to FIG. 10. The controller of the robot of the present embodiment is formed so that an operator can manually drive the robot. Furthermore, the controller is formed so that an inching operation in which a position and an orientation of the robot are changed by a minute driving amount can be performed. Control for manually driving a robot can be used, for example, when a teaching point is set.

Figure 1:
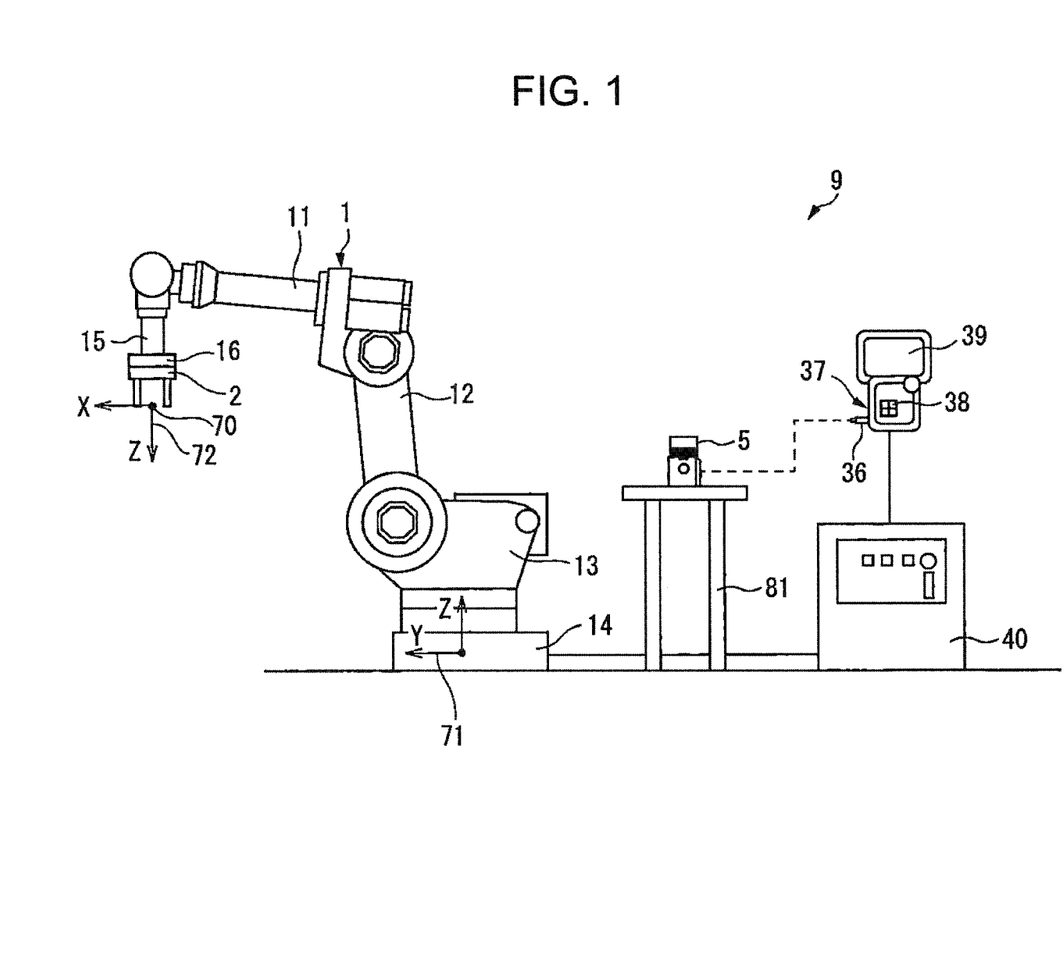
FIG. 1 is a side view of a robot apparatus of an embodiment.

FIG. 1 is a schematic view of a robot apparatus in the present embodiment. The robot apparatus 9 includes a hand 2 as a working tool and a robot 1 that moves the hand 2. The robot 1 of the present embodiment is an articulated robot having a plurality of joints. Each constituent member of the robot 1 is formed so as to rotate around a drive axis of the robot 1. The robot 1 of the present embodiment includes a base 14 and a rotation base 13 supported by the base 14. The rotation base 13 rotates relative to the base 14. The robot 1 includes an upper arm 11 and a lower arm 12. The lower arm 12 is supported by a rotation base 13. The upper arm 11 is supported by the lower arm 12. The robot 1 includes a wrist 15 which is supported by the upper arm 11. The hand 2 for gripping or releasing the workpiece is fixed to the flange 16 of the wrist 15.

The robot 1 of the present embodiment includes six driving axes, but the embodiment is not limited to this. A robot that changes the position and the orientation by any mechanism can be employed. Further, the working tool of the present embodiment is the hand that grips the workpiece, but is not limited to this embodiment. The operator can select a working tool according to the operation that is performed by the robot apparatus. For example, a working tool for removing burrs, a working tool for performing welding, or a working tool for applying an adhesive, or the like can be employed.

A reference coordinate system 71 is set in the robot apparatus 9 of the present embodiment. In the example illustrated in FIG. 1, an origin of the reference coordinate system 71 is arranged at the base 14 of the robot 1. The reference coordinate system 71 is also referred to as a world coordinate system. The reference coordinate system 71 is a coordinate system in which the position of the origin is fixed, and further, the orientation of the coordinate axis is fixed. Even if the position and the orientation of the robot 1 change, the position and the orientation of the reference coordinate system 71 do not change. The reference coordinate system 71 has an X axis, a Y axis, and a Z axis which are orthogonal to each other as coordinate axes. Additionally, a W axis is set as the coordinate axis around the X axis. A P axis is set as the coordinate axis around the Y axis. An R axis is set as the coordinate axis around the Z axis.

In the present embodiment, the tool coordinate system 72 that has an origin which is set at any position in the working tool is set. The origin of the tool coordinate system 72 of the present embodiment is set to a tool center point 70. The tool coordinate system 72 has an X axis, a Y axis, and a Z axis which are orthogonal to each other as coordinate axes. In the example illustrated in FIG. 1, the tool coordinate system 72 is set so that the extending direction of the Z axis is parallel to the direction in which the claw part of the hand 2 extends. Furthermore, the tool coordinate system 72 has a W axis around the X axis, a P axis around the Y axis, and an R axis around the Z axis. For example, the position of the robot 1 corresponds to the position of the tool center point 70. Furthermore, the orientation of the robot 1 corresponds to the orientation of the tool coordinate system 72 with respect to the reference coordinate system 71.

Figure 2:
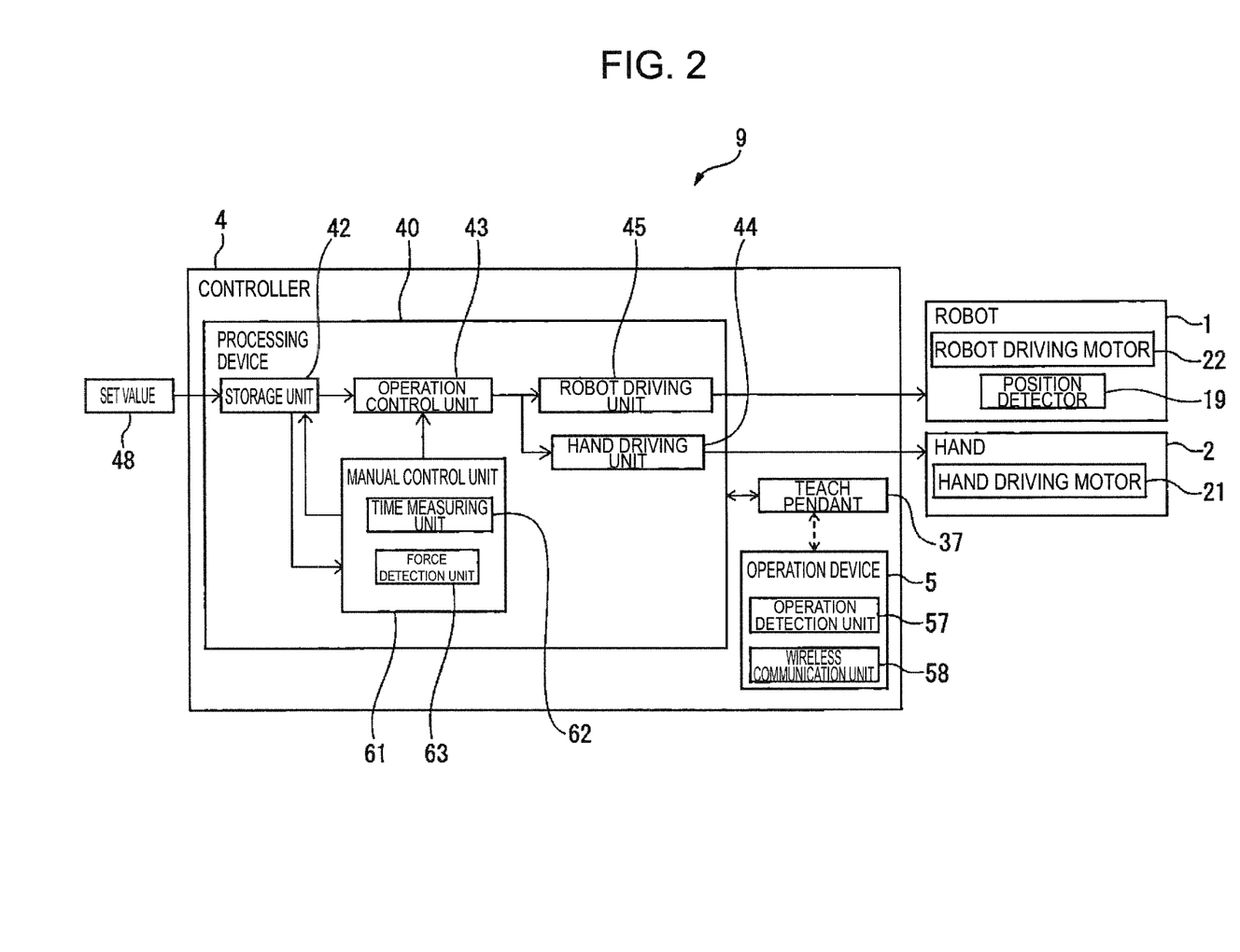
FIG. 2 is a block diagram of the robot apparatus of the embodiment.

FIG. 2 is a block diagram illustrating the robot apparatus of the present embodiment. Referring to FIG. 1 and FIG. 2, the robot 1 includes a robot driving device that changes the position and the orientation of the robot 1. The robot driving device includes a robot driving motor 22 that drives constituent members such as an arm and a wrist. In the present embodiment, a plurality of robot driving motors 22 are arranged corresponding to the respective drive axes.

The robot apparatus 9 includes a hand driving device that drives the hand 2. The hand driving device includes a hand driving motor 21 that drives the claw part of the hand 2. The claw part of the hand 2 is opened or closed by driving the hand driving motor 21.

The robot apparatus 9 includes a controller 4 that controls the robot 1 and the hand 2. The controller 4 includes a processing device 40 that performs the control, and a teach pendant 37 for the operator to operate the processing device 40. The processing device 40 includes an arithmetic processing device (computer) including a Central Processing Unit (CPU) serving as a processor, and a Random Access Memory (RAM) and a Read Only Memory (ROM) or the like connected to the CPU via a bus. The robot 1 and the hand 2 are connected to the controller 4 via a communication device.

The teach pendant 37 is connected to the processing device 40 via a communication device. The teach pendant 37 includes an input part 38 for inputting information regarding the robot 1 and the hand 2. The input part 38 is constituted of a keyboard, a dial, and the like. The operator can input the set value of the variables, allowable ranges of the variables, and the like into the processing device 40 from the input part 38. The teach pendant 37 includes display part 39 that displays information regarding the robot 1 and the hand 2.

The operator can set a teaching point of the robot 1 by manually driving the robot 1. The controller 4 can generate an operation program for performing the operation of the robot 1 and the hand 2 based on the teaching point. Alternatively, the operation program may be input to the controller 4.

The processing device 40 includes a storage unit 42 that stores information regarding the control of the robot 1 and the hand 2. The storage unit 42 can be configured by a storage medium capable of storing information, such as a volatile memory, a non-volatile memory, or a hard disk. The processor of the arithmetic processing device is formed to be able to read the information stored in the storage unit 42. The operation program is stored in the storage unit 42. The robot apparatus 9 of the present embodiment conveys the workpiece based on the operation program. The robot 1 can automatically convey the workpiece from an initial position to a target position.

The processing device 40 includes an operation control unit 43 configured to control the operation of the robot 1. The operation control unit 43 corresponds to a processor that is driven in accordance with the operation program. The processor reads the operation program and functions as the operation control unit 43 by performing the control that is defined in the operation program.

The operation control unit 43 sends operation commands for driving the robot 1 based on the operation program to a robot driving unit 45. The robot driving unit 45 includes an electric circuit that drives the robot driving motor 22. The robot driving unit 45 supplies electricity based on the operation commands to the robot driving motor 22. Further, the operation control unit 43 controls the operation of the hand 2. The operation control unit 43 sends operation commands for driving the hand 2 based on the operation program to a hand driving unit 44. The hand driving unit 44 includes an electric circuit that drives the hand driving motor 21. The hand driving unit 44 supplies electricity based on the operation commands to the hand driving motor 21.

The robot 1 includes a status detector for detecting the position and orientation of the robot 1. The status detector of the present embodiment includes a position detector 19 which is attached to the robot driving motor 22 corresponding to the driving axis of an arm, and the like. The orientation of the constituent member along each driving axis can be acquired from an output from the position detector 19. For example, the position detector 19 detects a rotational angle when the robot driving motor 22 is driven. In the present embodiment, the position and the orientation of the robot 1 are detected based on the output from a plurality of the position detector 19.

Figure 3:
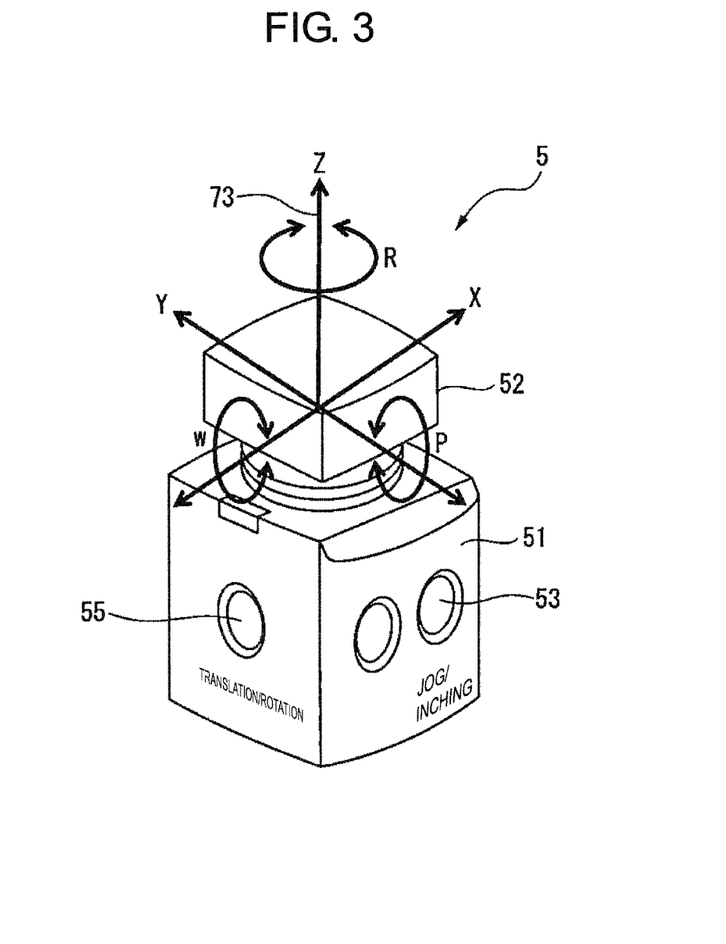
FIG. 3 is an enlarged perspective view of an operation device of the embodiment.

FIG. 3 is an enlarged perspective view of an operation device of the present embodiment. Referring to FIG. 1 to FIG. 3, the controller 4 of the robot of the present embodiment includes an operation device 5 for an operator to perform an operation of manually changing the position and the orientation of the robot 1. In the present embodiment, the operation device 5 is fixed to a stationary frame 81. The operator can perform manual operation of the robot 1 by standing in the vicinity of the frame 81 and operating the operation device 5.

The operation device 5 of the present embodiment includes an arithmetic processing device including a CPU serving as a processor, RAM, and the like. The operation device 5 includes a wireless communication unit 58 including a communication member for performing communication. The teach pendant 37 also includes a wireless communication unit including a wireless dongle 36 as a communication member. The operation device 5 is formed so as to be able to communicate with each other wirelessly with the teach pendant 37. Further, the operation device 5 is formed so as to be able to communicate with the processing device 40 via the teach pendant 37. The processing device 40 can process a signal from the operation device 5.

The operation device 5 of the present embodiment is formed so as to be able to communicate wirelessly with the teach pendant 37, but the embodiment is not limited to this. The operation device 5 may be connected to teach pendant 37 via a communication line. Alternatively, the operation device 5 may be formed so as to be able to communicate with the processing device 40 wirelessly or by the communication line.

The operation device 5 of the present embodiment includes a main body 51 and a stick 52 serving as a movable part that is supported by the main body 51. The movable part is constituted by a movable member that moves by being operated by an operator. The stick 52 is formed so as to move relative to the main body 51. The main body 51 is fixed to the frame 81.

In FIG. 3, an operation coordinate system 73 for illustrating the operation of the stick 52 is described. The origin of the operation coordinate system 73 can be arranged on the axis of the stick 52 when the hand is released from the stick 52. Also, the orientation of the operation coordinate system 73 can be set to any orientation. In the example illustrated in FIG. 3, the Z axis is arranged so as to overlap the axis of the stick 52 when the hand is released from the stick 52.

The stick 52 of the present embodiment is formed so as to be able to tilt in the X axis direction and the Y axis direction of the operation coordinate system 73. That is, the stick 52 is formed so as to rotate about a predetermined rotation center. Additionally, the stick 52 is formed so as to be able to tilt even in an intermediate region sandwiched between the X axis and the Y axis. As described above, the stick 52 is formed so as to be able to tilt in any direction. Additionally, the stick 52 is formed so as to be able to perform a pulling operation or a pushing operation in the Z axis direction.

A spring serving as an elastic member that biases the stick 52 back to the neutral state is arranged inside the main body 51. The neutral state is, for example, a state in which the axis of the stick 52 extends in the vertical direction. In the Z axis direction, the center position of the operable range of the pushing operation and the pulling operation corresponds to the position of the neutral state.

Furthermore, the operation device 5 of the present embodiment is formed so that the stick 52 can be rotated in the direction of the R axis around the Z axis of the operation coordinate system 73. In other words, it is formed so that the stick 52 can be twisted by the operator. The position of the neutral state at this time corresponds to a central position in the range in which the twisting operation along the R axis is possible.

The arithmetic processing device of the operation device 5 includes an operation detection unit 57 for detecting an operation of the operator. The operation detection unit 57 corresponds to a processor that is driven in accordance with the operation program. The processor reads the operation program and functions as the operation detection unit 57 by performing the control defined in the operation program. When the operator operates the stick 52, the operation detection unit 57 detects an operation direction and an operation amount of the stick 52. As the operation amount, the movement amount of the stick 52 at a predetermined position or an angle of rotation around the center of rotation when the stick 52 rotates can be detected.

The operation detection unit 57 can detect the operation direction and the operation amount by using each the coordinate value of the operation coordinate systems 73. In particular, the operation detection unit 57 is formed so that the operation amount from the neutral state of the stick 52 can be detected. In this way, the operation detection unit 57 can detect the operation that is performed by the operator. Note that the operation detection unit may not include a CPU as a processor. The operation detection unit may be formed so that the operation of the stick by the operator can be detected by a mechanical mechanism.

The operation device 5 of the present embodiment is fixed to the frame 81, but the embodiment is not limited to this. The operation device 5 can be arranged in various positions. For example, the operation device 5 can be fixed to a support member by arranging the support member on the wrist 15 or the hand 2 of the robot 1. That is, the operation device 5 can be arranged so as to move with the wrist 15 or the hand 2 of the robot 1. In this case, the operator can manually change the position and the orientation of the robot 1 by standing in the vicinity of the robot 1 and operating the operation device 5. Alternatively, the operator may hold the operation device by a hand so as to operate the operation device.

Figure 4:
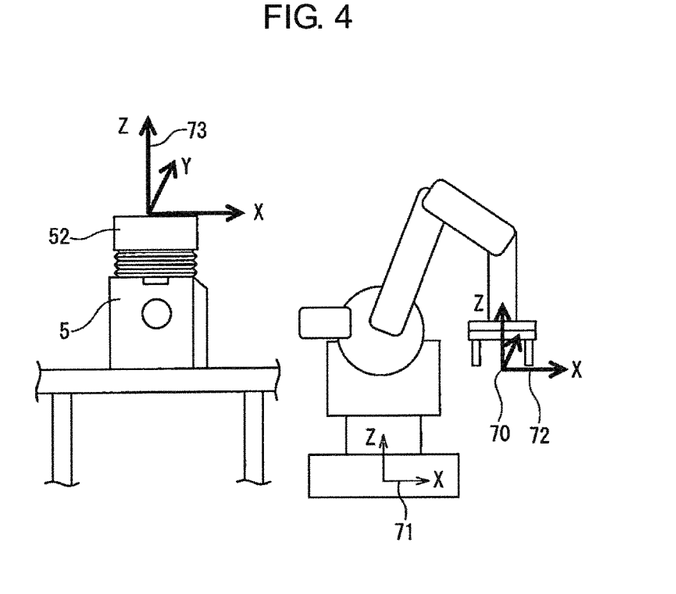
FIG. 4 is a schematic diagram illustrating an operation of the robot when the operation device is operated.

FIG. 4 is a schematic view of an operation device and a robot for illustrating the correspondence between the operation direction of the stick of the operation device and the direction in which the robot is driven. Referring to FIG. 2 and FIG. 4, the processing device 40 of the present embodiment is formed to be able to perform a jog operation in which the position and the orientation of the robot 1 are continuously changed, during the period in which the operation of the stick 52 is performed. Furthermore, the processing device 40 is formed to be able to perform the inching operation that changes the position and the orientation of the robot 1 by the predetermined minute amount in response to the operation of the stick 52. The operation device 5 of the present embodiment includes a button 53 that switches between a jog mode for performing a jog operation and an inching mode for performing an inching operation. The operator can switch between the jog mode and the inching mode by pressing the button 53.

(Control of Jog Operation)

The jog operation for continuously changing the position and the orientation of the robot 1 will be described. When performing the jog operation, the operator sets the control mode to the jog mode. The processing device 40 changes the position and the orientation of the robot 1 during the period in which the stick 52 is being operated. In the jog operation, the position and the orientation of the robot 1 are changed in response to the operation direction and the operation amount of the stick 52 of the operation device 5.

The processing device 40 of the present embodiment includes a manual control unit 61 that changes the position and the orientation of the robot 1 in response to the operation of the operation device 5. The manual control unit 61 sends an operation command to the operation control unit 43 in response to the operation of the operation device 5. Then, the operation control unit 43 changes the position and the orientation of the robot 1 based on the operation command. As described below, the manual control unit 61 includes a time measuring unit 62 and a force detection unit 63. Each unit of the manual control unit 61, the time measuring unit 62, and the force detection unit 63 corresponds to a processor that is driven in accordance with the operation program. The processor functions as each unit by reading the operation program and performing control defined in the operation program.

In the jog operation, the manual control unit 61 can drive the robot 1 so that the direction of the coordinate axis in the operation coordinate system 73 corresponds to the direction of the coordinate axis of the tool coordinate system 72. For example, when the operator tilts the stick 52 in the X axis direction of the operation coordinate system 73, the manual control unit 61 controls the robot 1 so that the tool center point 70 moves in the direction of the X axis of the tool coordinate system 72.

In the present embodiment, the operation device 5 is fixed to the frame. The position and the orientation of the operation device 5 is immobile, thus, the position and the orientation of the operation coordinate system 73 is fixed. The operator can input the position and the orientation of the operation coordinate system 73 as a set value 48. For example, the operator can input the position and the orientation of the operation coordinate system 73 with respect to the reference coordinate system 71 in advance. Further, the manual control unit 61 can calculate the position and the orientation of the tool coordinate system 72 with respect to the reference coordinate system 71 based on the output of the position detector 19. For this reason, the manual control unit 61 can calculate the relative position and the relative orientation of the tool coordinate system 72 with respect to the operation coordinate system 73.

Similarly, when the operation device 5 is fixed to the hand or the wrist of the robot, the position and the orientation of the operation coordinate system 73 with respect to the reference coordinate system 71 is calculated based on the output of the position detector 19. For this reason, the manual control unit 61 can calculate the relative position and the relative orientation of the tool coordinate system 72 with respect to the operation coordinate system 73.

When the operator operates the stick 52 in one direction of the operation coordinate system 73, the manual control unit 61 changes the position and the orientation of the robot 1 such that the tool coordinate system 72 (hand 2) moves in the direction in which the stick 52 is operated.

Here, the controller 4 is formed so as to be able to switch between a translation operation that moves the position of the tool center point 70 while maintaining the orientation of the hand 2, and a rotation operation that changes the orientation of the hand 2 while maintaining the position of the predetermined point. In the rotation operation of the present embodiment, the hand 2 rotates about the tool center point 70 as the center of rotation. The operator may switch between the translation operation and the rotation operation by pressing a button 55 arranged on the main body 51. For example, referencing FIG. 3, in the translation operation, by tilting the stick 52 in the direction of the X axis of the operation coordinate system 73, the hand 2 is controlled so as to move in the direction of the X axis of the tool coordinate system 72. In the rotation operation, by tilting the stick 52 in the direction of the X axis of the operation coordinate system 73, the hand 2 is controlled so as to rotate in the direction of the W axis of the tool coordinate system 72.

A movement speed and a rotation speed of the hand 2 in the jog operation (the movement speed and the rotational speed of the tool coordinate system 72) can be predetermined by the operator and stored in the storage unit 42 as set values 48. Furthermore, regarding the movement amount of the jog operation, the robot 1 continues to be driven during the period when the operator is operating the stick 52.

In the above embodiment of the jog operation, the position and the orientation of the robot 1 are changed so that the coordinate axes of the operation coordinate system 73 correspond to the coordinate axes of the tool coordinate system 72, but the embodiment is not limited to this. The robot 1 can be controlled so that the working tool moves or rotates in any direction according to the operation of the stick 52 of the operation device 5. For example, the manual control unit 61 may change the position and the orientation of the robot 1 so that the coordinate axes of the operation coordinate system 73 correspond to the coordinate axes of the reference coordinate system 71. For example, when the stick 52 tilts in the direction of the X axis of the operation coordinate system 73, the manual control unit 61 may control the position of the tool center point 70 so as to move in the direction of the X axis of the reference coordinate system 71.

Alternatively, the manual control unit can control the wrist so as to move in a direction in which the stick is operated, when the operation device is arranged on the wrist of the robot. In this case, the coordinate axis of the operation coordinate system and the coordinate axis of the tool coordinate system may be set so that the direction in which the stick is operated matches the direction in which the wrist is moved.

(Control of Inching Operation)

Next, an inching operation in which the position and the orientation of the robot 1 are changed by a predetermined minute amount will be described. When performing the inching operation, the operator switches the control mode to the inching mode by pressing a button 53. The drive amount of the robot in the inching mode is minute. For example, in the translation operation, the movement distance of the hand 2 (the movement distance of the tool coordinate system 72) is set to be 10 mm or less. More preferably, the movement distance of the hand 2 is set to be 5 mm or less. In the rotation operation, for example, the rotation angle of the hand 2 (the rotation angle of the tool coordinate system 72) is set to be 5° or less. More preferably, the rotation angle of the working tool is set to be 1° or less.

(Determination Control for Determining Whether or not Inching Operation is Performed)

First, determination control for determining whether or not an inching operation is performed will be described. A first control of the determination control is similar to the control of the jog operation. When the operator moves the stick 52, the manual control unit 61 performs a control for performing the inching operation. That is, regardless of the time length in which the stick 52 is operated or the force applied to the stick 52, when the stick 52 is operated, the manual control unit 61 performs the inching operation by a predetermined movement amount.

In a second control and a third control of the determination control, the manual control unit 61 determines whether or not the inching operation is performed based on the elapsed time from the time when the stick 52 is operated. Referring to FIG. 2, the manual control unit 61 of the present embodiment includes a time measuring unit 62 that measures the time associated with the operation of the stick 52. The determination value of the elapsed time of the operation can be predetermined by the operator. For example, a time of 1 second or less can be set as the determination value of the elapsed time. The operator can store the determination value in the storage unit 42 as the set value 48.

In the second control of the determination control, the manual control unit 61 does not perform the inching operation when the elapsed time from the time when the stick 52 is operated until the hand is released is longer than the predetermined determination value. On the other hand, the manual control unit 61 performs the inching operation when the elapsed time from the time when the stick 52 is operated until the hand is released is equal to or less than the predetermined determination value. The manual control unit 61 determines that the operator has released a hand from the stick 52 when the stick 52 returns to the neutral state.

In the second control, when the operator continues to operate the stick 52 for a longer period of time than the predetermined determination value, the manual control unit 61 does not perform the inching operation. On the other hand, when the operator releases the hand in a period of time equal to or less than the predetermined determination value, the manual control unit 61 performs the inching operation one time.

In the inching operation, the position and the orientation of the robot 1 slightly change. In the second control, the inching operation is performed when the operator operates the stick 52 in a short period of time. In the second control, when performing the inching operation of a slight movement amount, it is sufficient to perform an operation for a short time, and the operator can perform the inching operation without discomfort. Alternatively, the operator may sometimes misunderstand that the current control mode is the jog mode even though the current control mode is the inching mode. In such a case, the robot 1 can be avoided from being driven by operating the stick 52 for a long time.

In the third control of the determination control, the manual control unit 61 does not perform the inching operation when the elapsed time from the time when the stick 52 is operated until the hand is released, is shorter than the predetermined determination value. On the other hand, when the elapsed time from the time when the stick 52 is operated is equal to or greater than the predetermined determination value, the manual control unit 61 performs the inching operation.

In the third control, the manual control unit 61 does not perform the inching operation when the operator released the hand from the stick 52 within a shorter time than the predetermined determination value. On the other hand, when the stick 52 continues to be operated in a period of time equal to or greater than the predetermined determination value, the manual control unit 61 performs the inching operation one time. By performing the third control, it is possible to avoid performing the inching operation when the operator mistakenly operates the stick or the operator strikes against the stick.

Next, in a fourth control and a fifth control of the determination control, the manual control unit 61 determines whether or not the inching operation is performed based on the magnitude of the force with which the stick 52 is operated. Such a determination value of the force can be set in advance by the operator. The determination value can be stored in the storage unit 42 as the set value 48. The determination value of magnitude can, for example, be set to a value of 5N or less. More preferably, the determination value of the magnitude of the force can be set to a value of equal to or less than 2N. Alternatively, the determination value of the force may be set based on the movement amount of the stick 52. For example, the determination value of the force may be set to a magnitude at the time when the stick 52 is operated to a position that is ½ of the maximum movement amount.

The manual control unit 61 includes a force detection unit 63 that detects the magnitude of the force applied to the stick 52 when the stick 52 is operated. The force detection unit 63 detects the magnitude of the force with which the stick 52 is operated based on the output of the operation detection unit 57. The force detection unit 63 of the present embodiment acquires the operation amount from the neutral state of the stick 52 from the operation detection unit 57. The force detection unit 63 can calculate a magnitude of the force applied by the operator based on the operation amount of the stick 52.

In the present embodiment, as described above, the spring is arranged inside the main body 51 such that the stick 52 returns to the neutral state. The greater the amount of operation detected by the operation detection unit 57, the greater the force applied by the operator. The force detection unit 63 can calculate the magnitude of the force applied to the stick 52 based on the operation amount of the stick 52.

In the fourth control of the determination control, the manual control unit 61 performs a control that does not perform the inching operation when the magnitude of the force with which the stick 52 is operated is equal to or greater than the predetermined determination value. On the other hand, the manual control unit 61 performs the inching operation when the magnitude of the force with which the stick 52 is operated is less than a predetermined determination value. The manual control unit 61 performs the inching operation one time for one operation.

In a fourth control, an inching operation can be performed with a small force. The inching operation can be performed with a slight movement amount of the stick 52. For this reason, the inching operation can be performed in a short period of time when performing the inching operation a plurality of times. For this reason, the robot 1 can be driven in a short time to the target position and orientation.

In the fifth control of the determination control, the manual control unit 61 does not perform the inching operation when the magnitude of the force with which the stick 52 is operated is equal to or less than the predetermined determination value. On the other hand, when the magnitude of the force at the time when the stick 52 is operated is greater than the predetermined determination value, the manual control unit 61 performs the inching operation. The manual control unit 61 performs the inching operation one time for one operation.

In the fifth control, the inching operation is performed when the force applied to the stick 52 is great. For this reason, the inching operation can be avoided when the operator mistakenly touches the stick 52.

Note that, in the fourth control and the fifth control, the time length of operating the stick 52 may be measured by the time measuring unit 62. The range of time length of operating the stick 52 can be determined. The manual control unit 61 may determine the force applied to the stick within this range of time length.

Furthermore, the processing device 40 may be formed so that the plurality of the controls described above can be performed with respect to a determination control that determines whether or not the inching operation of the robot 1 is performed. In this case, the processing device 40 can be formed so as to switch between the plurality of the controls.

In the determination control of the present embodiment, it is possible to determine whether or not the inching operation is performed by the operation of the operation device, thus, the operability of the manual operation is improved.

(Movement Direction Control Regarding Movement Direction of Working Tool)

Next, control regarding the movement direction of the working tool will be described. In a first control regarding the movement direction of the working tool, control which is similar to the aforementioned control of the jog operation is performed even in the inching operation. The manual control unit 61 can change the position and the orientation of the robot 1 so that the hand 2 moves toward the direction of the tool coordinate system 72 corresponding to the direction of operation of the stick 52 in the operation coordinate system 73.

For example, the operator selects the translation operation or the rotation operation with the button 55. The manual control unit 61 acquires the operation of the stick 52 based on the operation coordinate system 73. The manual control unit 61 changes the position and the orientation of the robot 1 so that the hand 2 moves or rotates in the direction of the tool coordinate system 72 corresponding to the direction of operation of the stick 52. For example, when the operator tilts the stick 52 in the direction of the X axis of the operation coordinate system 73 in the control mode in which the translation operation is performed, the manual control unit 61 changes the position and the orientation of the robot 1 such that the tool center point 70 moves in the direction of the X axis of the tool coordinate system 72.

In the first control, since the direction in which the stick 52 is operated corresponds to the direction in which the hand 2 moves, the operator can operate the robot 1 even without looking at the teach pendant 37. For example, the robot 1 can be operated while viewing the robot 1 without confirming the position of the button that is corresponded to the direction of operation and that is arranged on the teach pendant 37.

Next, in the second control regarding the movement direction of the working tool, the manual control unit 61 performs the inching operation such that the hand 2 moves in the predetermined direction regardless of the type of operation of the stick 52. The operator can set the setting direction in which the hand 2 moves and store the setting direction as the set value 48 in the storage unit 42.

For example, the direction on the positive side of the Y axis of the reference coordinate system 71 can be set as the setting direction in which the hand 2 moves. Even if the operator tilts the stick 52 in the X axis direction of the operation coordinate system 73, tilts it in the Y axis direction, pushes it in the Z axis direction, and pulls it in the Z axis direction, the manual control unit 61 controls the robot 1 so that the tool center point 70 moves in the positive direction of the Y axis.

Alternatively, the operator can set a curved movement path along which the hand 2 moves in advance. The operator can store the curved movement path as a set value 48 in the storage unit 42. The movement path can be set in any coordinate system. For example, the path represented by the reference coordinate system 71 can be set as the movement path. The movement path includes the orientation of the hand 2 in addition to the direction in which the hand 2 moves.

Figure 5:
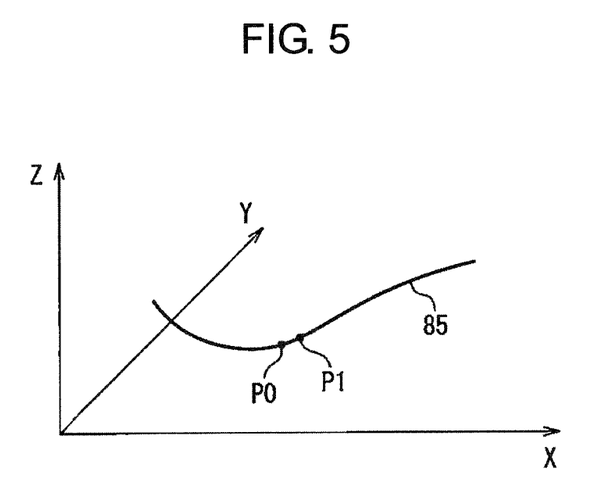
FIG. 5 is a diagram illustrating a movement path when an inching operation is performed.

FIG. 5 illustrates a schematic diagram illustrating a curved movement path. The coordinate axes of the reference coordinate system 71 are illustrated in FIG. 5. The operator can set the movement path 85 in which the tool center point 70 moves in the space around the robot 1. Furthermore, the orientation of the hand 2 can be set in the movement path 85. For example, a tool center point 70 is arranged at a position P0. By operating the stick 52 in any direction, the operator changes the position and the orientation of the robot 1 so that the tool center point 70 moves from the position P0 to the position P1. The tool center point 70 moves along the movement path 85.

By performing the second control, the inching operation can be performed such that the hand 2 moves along the predetermined movement path 85. For example, when the removal of burrs formed in the corner of the workpiece is performed, it may be confirmed whether or not the tool attached to the working tool moves along the shape of the corner. The operator may set a curved movement path along the shape of the corner. Then, the operator changes the position and the orientation of the working tool by a minute amount along the movement path by performing the inching operation. The operator can confirm whether or not the position and orientation of the working tool is appropriate for each minute section. Note that in the example described above, the movement path is curved, but the embodiment is not limited to this. The movement path may be linear.

Next, in the third control regarding the movement direction of the working tool, the robot 1 can be controlled such that the hand 2 moves in a direction which is shifted by a predetermined angle with respect to the direction in which the stick 52 is operated by the operator. This predetermined angle can be set in advance by the operator and stored in the storage unit 42 as a preset set value 48 by the operator.

For example, the operator can set the 30° on the positive side of the R axis as the angle that shifts the direction of operation. In the translation operation, the operator performs an operation of tilting the stick 52 to the positive side of the X axis of the operation coordinate system 73. The manual control unit 61 can control the position and the orientation of the robot 1 so that the hand 2 moves in a direction which is shifted 30° on the positive side of the R axis from a direction on the positive side of the X axis of the tool coordinate system 72.

The processing device 40 may be formed so as to be able to perform the plurality of the controls regarding the movement direction of the hand described above. In this case, the processing device 40 can be formed so that the plurality of the controls can be switched.

In the movement direction control of the present embodiment, the hand can be moved in a desired direction by operation of the operation device corresponding to the direction in which the hand moves. For this reason, the operability of manual operation is improved.

(Movement Amount Control Regarding Movement Amount of Hand)

Next, control regarding the movement amount by which the hand 2 changes in position and orientation in one inching operation will be described. In the translation operation, for example, the length at the time when the hand 2 (or the tool center point 70) moves corresponds to the movement amount. In addition, in the rotation operation, for example, the rotation angle at which the hand 2 rotates corresponds to the movement amount. The movement amount can be set in various forms. The operator can set the movement amount in advance and store the movement amount as a set value 48 in the storage unit 42. The manual control unit 61 changes the position and the orientation of the robot 1 so that the hand 2 moves by a predetermined movement amount when the movement direction of the hand 2 is determined.

In a first control regarding the amount of hand movement, when performing the translation operation, the operator sets the straight-line distance from the current position P0 to the moved position P1 as the movement amount. That is, the straight-line distance that the tool center point 70 moves is set as the movement amount. In addition, when performing the rotation operation, the operator can set the rotation angle of the hand 2 as the movement amount.

Figure 6:
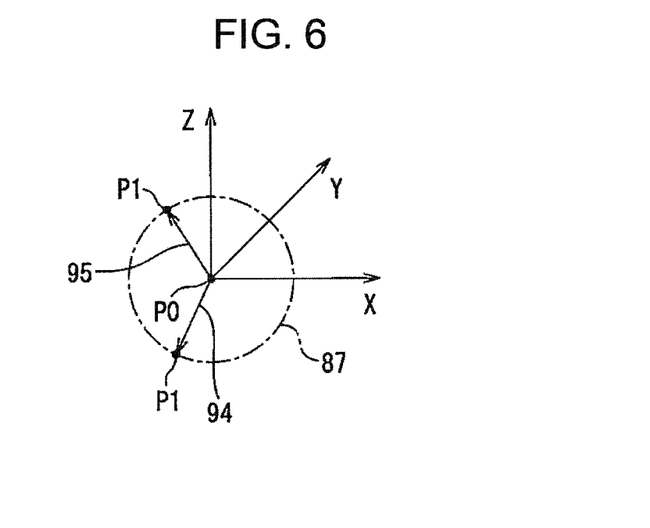
FIG. 6 is a first diagram illustrating a movement amount in the inching operation.

FIG. 6 shows a first graph that describes the movement amount in the first control. In FIG. 6, the movement amount of the working tool in a translation operation is illustrated in the tool coordinate system 72. That is, the distance at which the tool center point 70 moves from the start point position P0 of the inching operation to the position P1 at the end of the inching operation is illustrated. The movement amount in all directions is indicated by a sphere 87. In FIG. 6, the movement amount in the inching operation is set to a distance that is equal for all directions. For example, the movement amount in the movement direction indicated by the arrow 94 and the movement amount in the movement direction indicated by the arrow 95 are set to be equal.

Figure 7:
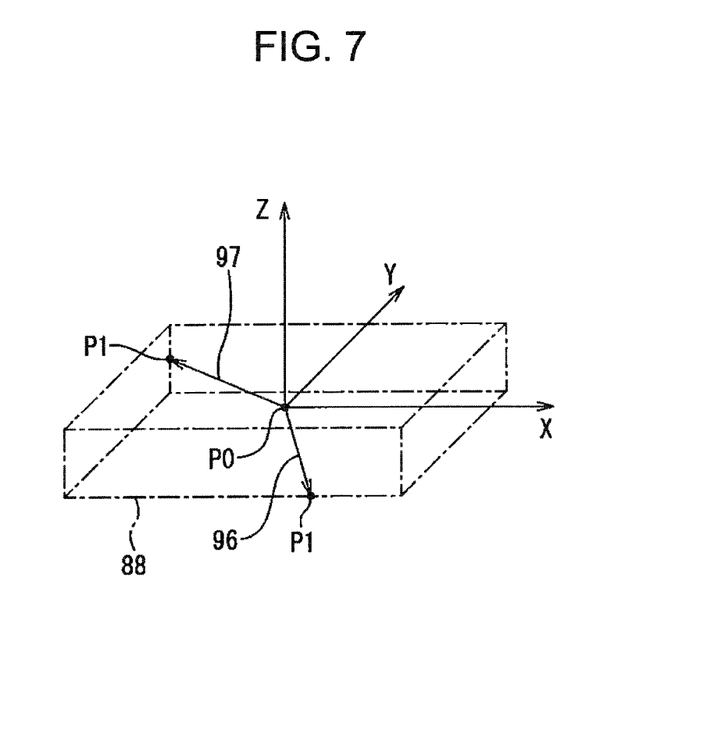
FIG. 7 is a second diagram illustrating a movement amount in the inching operation.

FIG. 7 shows a second graph that describes the movement amount in the first control. In FIG. 7, the movement amount of the working tool in the translation operation is illustrated in the tool coordinate system 72. In each movement direction, the movement amount can be set to be different. In the second graph, the movement amount is indicated by a quadrangular prism 88. In the example illustrated in FIG. 7, the movement amount is set to be large in the direction of the X axis, and the movement amount is set to be small in the Y axis direction and the Z axis direction. As a result, the movement amount in the movement direction indicated by the arrow 96 is smaller than the movement amount in the movement direction indicated by the arrow 97. In this way, the movement amount can be set to any distance in each direction.

In the examples illustrated in FIG. 6 and FIG. 7 that are described above, the translation operation is described, but a similar control for rotation operation can be performed. For example, the same movement amount (rotation angle) can be set for the W axis, the P axis, and the R axis of the tool coordinate system 72. Alternatively, different amounts of movement (rotation angle) may be set for each of the W axis, the P axis, and the R axis of the tool coordinate system 72.

Next, in the second control regarding the movement amount of the hand, in the translation operation, the length projected on the predetermined plane is set to be the movement amount of the straight-line movement from the current position P0 to the position P1 where the inching operation ends.

Figure 8:
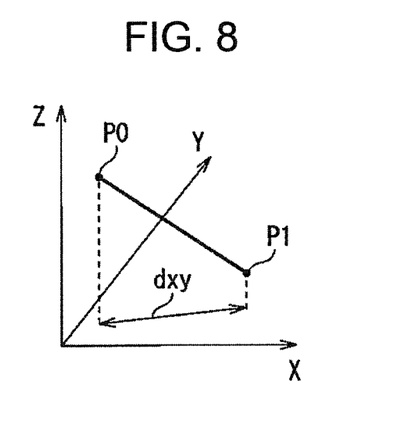
FIG. 8 is a third diagram illustrating a movement amount in the inching operation.

FIG. 8 is a schematic diagram illustrating the length when a straight-line movement path is projected on the XY plane. The movement path of FIG. 8 is illustrated in a tool coordinate system 72. In the example here, the XY plane is set as the predetermined plane. By performing the inching operation, the tool center point 70 moves from a position P0 to a position P1. At this time, the operator can set a distance dxy obtained by projecting the movement path onto, for example, the XY plane including the X axis and the Y axis. The manual control unit 61 calculates the target position P1 in which a distance is dxy in the XY plane based on the movement direction. The manual control unit 61 changes the position and the orientation of the robot 1 such that the tool center point 70 moves from the position P0 to the position P1.

Next, as illustrated in FIG. 5, the third control regarding the movement amount is the control when the curved movement path 85 among which the hand 2 moves is predetermined. Regardless of the type of operation of the stick 52 by the operator, the tool center point 70 moves along the movement path 85.

Figure 9:
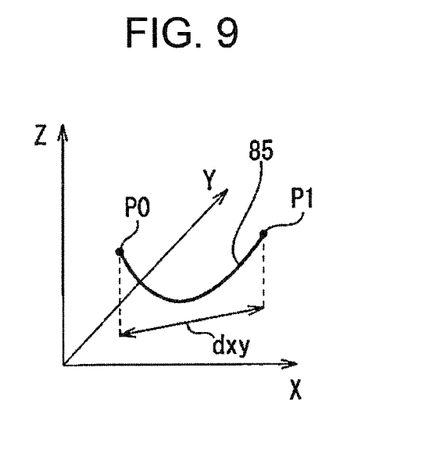
FIG. 9 is a fourth diagram illustrating a movement amount in the inching operation.

FIG. 9 illustrates a diagram that describes the movement amount of the third control. In the third control, the movement is performed from the current position P0 to the position P1 by the inching operation. The movement amount in this case is set at a length projected on a predetermined plane. In the example here, the XY plane is set as the predetermined plane. The operator can set the length dxy projected on the XY plane as the movement amount. The manual control unit 61 can calculate the position P1 where the projected length becomes the length dxy based on the position P0 and the movement path 85. The manual control unit 61 changes the position and the orientation of the robot 1 such that the tool center point 70 moves along the movement path 85 from the position P0 toward the position P1.

Next, as illustrated in FIG. 5, the fourth control regarding the movement amount is the control when the curved movement path 85 among which the hand 2 moves is predetermined. In the fourth control, the movement length along the movement path 85 is set as the movement amount.

Figure 10:
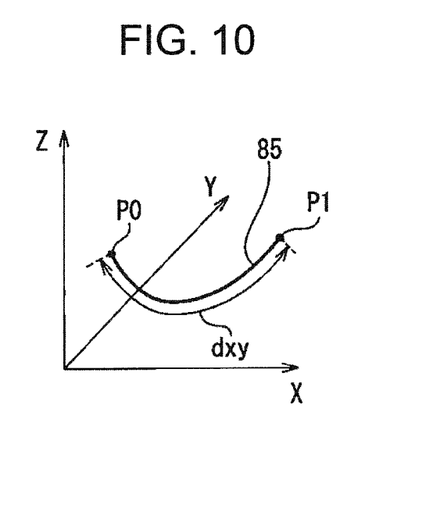
FIG. 10 is a fifth diagram illustrating a movement amount in the inching operation.

FIG. 10 illustrates a diagram that describes the movement amount of the fourth control. The movement path 85 is set to be curved. The tool center point 70 of the robot 1 moves along the movement path 85 from the position P0 to the position P1. In the fourth control, the length dxy which is the movement length along the movement path 85 from the position P0 to the position P1, can be set as the movement amount. The manual control unit 61 calculates the position P1 where the movement length moved along the movement path 85 is dxy, based on the position P0 and the movement path 85. When operating the operation device 5, the manual control unit 61 changes the position and the orientation of the robot 1 such that the tool center point 70 moves along the movement path 85 from the position P0 toward the position P1.

In the movement amount control of the present embodiment, the movement amount can be set by an appropriate method corresponding to the form of moving the respective hands. For this reason, the operability of manual operation is improved.

(Setting Control for Setting Movement Amount and Movement Direction)

Next, a setting control for setting the movement amount and the movement direction in the inching operation will be described. In the first control of the setting control, the movement amount and movement direction of the hand 2 are set by operating the teach pendant 37. The operator sets the movement amount by operating the input part 38 while viewing the display part 39.

Alternatively, an input device that is different from the teach pendant 37 can be arranged in order to set the movement amount and the movement direction. For example, the input device including a slider type handle or the input device including a rotatable knob can be connected to the teach pendant 37. The operator may set the movement amount and the movement direction by tilting the slider type handle while viewing the display part 39 of the teach pendant 37. Alternatively, the operator can set the movement amount and the movement direction by rotating the knob while viewing the display part 39 of the teach pendant 37.

In the second control to the sixth control of the setting control, the movement amount and the movement direction are set by operating the operation device 5 of the present embodiment. As illustrated in FIG. 7, when the movement amount is changed for each of the X axis, Y axis, and Z axis of the operation coordinate system 73, the movement amount can be set for each coordinate axis. The controller 4 is formed so as to be able to switch between the operation mode for operating the robot 1 and the setting mode for setting the set value. The setting mode includes a mode for setting the movement amount and a mode for setting the movement direction. When setting the movement amount, the operator switches to a mode for setting the movement amount in the setting mode. When setting the movement direction, the operator switches to a mode for setting the movement direction in the setting mode.

In the second control and the third control of the setting control, the manual control unit 61 sets the movement amount based on the time length of operating the stick 52 of the operation device 5. The time measuring unit 62 measures the time length after operating the stick 52.

In the second control of the setting control, the manual control unit 61 sets the movement amount based on the number of times that the stick 52 is operated within a predetermined determination value of time length. For example, when the stick 52 is pressed twice in the Z axis direction of the operation coordinate system 73 within 5 seconds, the movement amount can be set to 5 mm. In addition, when the stick 52 is pressed three times in the Z axis direction of the operation coordinate system 73 within 5 seconds, the movement amount can be set to 10 mm.

In the third control of the setting control, the manual control unit 61 performs a control for setting the movement amount based on the time length for continuing the operation of the stick 52. The determination value of the time length for continuing the operation can be predetermined. For example, when the stick 52 tilts on the positive side of the X axis, the manual control unit 61 can set the movement amount to 5 mm when the hand is released and the stick 52 returns to the neutral state within 1 second. In addition, when the stick 52 tilts on the positive side of the X axis, the movement amount can be set to 10 mm when the elapsed time until the hand is released is longer than 1 second.

In the fourth control of the settings control, the manual control unit 61 sets the movement amount based on the magnitude of the force applied to the stick 52. The force detection unit 63 detects a force applied to the stick 52. The manual control unit 61 sets the movement amount in response to the magnitude of the force acquired by the force detection unit 63. The determination value of the magnitude of the force can be predetermined. The determination value of the magnitude of the force can be set, for example, to 5N. When the operator operates the stick 52 with a force less than the determination value on the positive side in the X axis direction, the movement amount can be set to 5 mm. Furthermore, when the operator operates the stick 52 with a force equal to or greater than the determination value on the positive side in the X-axis direction, the movement amount can be set to 10 mm.

For setting of the movement direction, the following fifth control and sixth control can be performed. In the fifth control of the setting control, performance is possible when, in a second control of the control regarding the movement direction of the working tool, the hand 2 is moved in a predetermined movement direction. The operator can set the movement direction by operating the stick 52 in a direction corresponding to the movement direction in the operation coordinate system 73.

In the sixth control of the setting control, similar to the setting of the movement amount, the manual control unit 61 can set the movement direction based on the number of times that the stick 52 is operated within a predetermined determination value of time length. For example, when the stick 52 is pressed twice in the Z axis direction of the operation coordinate system 73 within 5 seconds, the movement direction can be set in the positive direction of the X axis. In addition, when the stick 52 is pressed three times in the Z axis direction of the operation coordinate system 73 within 5 seconds, the movement direction can be set in the positive direction of the X axis.

In addition, in the third control of the control regarding the movement direction of the working tool, the shifted angle can be set based on the number of times the stick 52 is operated, even when the angle shifted with respect to the direction in which the stick 52 is operated is set.

The control for setting the movement amount and the movement direction can be combined with the control for the setting described above. The operator switches the controller 4 to the setting mode for setting the set value. The movement direction can be set by a first time operation to the stick 52. The movement amount can be set by a second time operation to the stick 52.

For example, the direction in which the stick 52 is operated on the first time can be set to the movement direction in which the tool center point 70 moves. In the operation for the second time, the movement amount can be set based on the time length that the stick 52 is pushed in the Z axis direction. For example, when the time length of pushing the stick 52 is within 1 second, the movement amount can be set to 5 mm. Alternatively, when the time length of pushing the stick 52 is longer than 1 second, the movement amount can be set to 10 mm. In this way, the movement amount and the movement direction can be set continuously.

Note that the setting of the movement amount and the movement direction is not limited to the above-described embodiment. For example, the movement amount and the movement direction set by a device different from the teach pendant may be input to the processing device via a communication device.

In the second control to the sixth control of the setting control of the present embodiment, the movement amount and the movement direction can be set by the operation of the operation device. For this reason, the operability of manual operation is improved.

(Permission Control for Permitting Operation of Robot)

The operation device 5 of the present embodiment can be provided with the function of an enable switch. The enable switch is a switch that permits the robot to operate by pressing. For example, it can be controlled so that the operation of the robot is performed during the term in which the enable switch is pressed. Alternatively, the control can be performed that, when the enable switch is pushed once, the operation of the robot is permitted, and when the switch is pushed once again, the operation of the robot is prohibited.

In a first control that permits operation of the robot 1 of the present embodiment, the manual control unit 61 determines whether the robot 1 is permitted or prohibited based on the elapsed time from the time when the stick 52 is operated. Immediately after the operator turns on the power of the controller 4, the manual control unit 61 prohibits the operation of the robot 1. In this state, the operator operates the stick 52.

The time measuring unit 62 measures the elapsed time from the time when the stick 52 is operated. When the elapsed time from the time when the operator operates the stick 52 to the time when the hand is released (until the stick 52 returns to the neutral state) is less than the predetermined determination value of the time length, the manual control unit 61 performs a control that permits the operation of the robot 1. On the other hand, when the time elapsed since the operator operates the stick 52 until the hand is released is equal to or greater than the predetermined determination value of the time length, the manual control unit 61 performs a control that prohibits the operation of the robot 1. The determination value of the time length may set a time of, for example, 1 second or less.

That is, when the operator operates the stick 52 in a short period of time, the manual control unit 61 permits the operation of the robot 1. For example, before the operation for operating the robot 1 is performed, by pressing the stick 52 in the Z axis direction of the operation coordinate system 73 for a short period of time, the manual control unit 61 performs a control that permits the operation of the robot 1.

Alternatively, when the time elapsed since the operator operates the stick 52 until the hand is released is greater than the predetermined determination value of the time length, the manual control unit 61 may perform control that permits operation of the robot 1. That is, when the operator operates the stick 52 for a long period of time, the manual control unit 61 can permit the operation of the robot 1. As the determination value of the time length at this time, for example, a time length of 1 second or less can be set.

In the second control that permits the robot 1 to operate, the manual control unit 61 determines whether the robot 1 is permitted or prohibited based on the magnitude of the force with which the stick 52 is operated. In a state in which the manual control unit 61 prohibits operation of the robot 1, the operator operates the stick 52. The force detection unit 63 detects the magnitude of the force applied to the stick 52. When the magnitude of the force that the stick 52 is operated with is greater than a predetermined determination value, the manual control unit 61 performs a control that permits the operation of the robot 1. The determination value of the magnitude of the force can be set to a value of, for example, 5N or less. More preferably, the determination value of the magnitude of the force can be set to a value of equal to or less than 2N.

In this way, when the operator operates the stick 52 with a strong force, the manual control unit 61 performs a control that permits the operation of the robot 1. For example, when the operator presses the stick 52 to the deepest position, the manual control unit 61 performs a control that permits the operation of the robot 1. When the magnitude of the force with which the stick 52 is operated is equal to or less than the predetermined determination value, the manual control unit 61 performs a control that prohibits the operation of the robot 1.

Alternatively, when the magnitude of the force with which the stick 52 is operated is less than a predetermined determination value, the manual control unit 61 may perform control that permits the operation of the robot 1. That is, the control that, when the operator operates the stick 52 with a weak force, the operation of the robot 1 is permitted, and when the operator operates the stick 52 with a strong force, the operation of the robot 1 is prohibited, may be performed. In this case, a determination value of the force can be set to a value, for example, not greater than 5N. More preferably, the determination value of the magnitude of the force can be set to a value of equal to or less than 2N.

In this manner, the manual control unit 61 can switch between a state in which the operation of the robot 1 is permitted and a state in which the operation of the robot 1 is prohibited based on the time length in which the operator operates the stick or the magnitude of the force with which the operator operates the stick. In the state that the operation of the robot 1 is permitted, the manual control unit 61 drives the robot 1 in response to the operation of the stick 52 of the operator. On the other hand, in a state that the operation of the robot 1 is prohibited, the manual control unit 61 does not drive the robot 1 even when the operator operates the stick 52.

After the operation of the robot 1 is permitted, the operator can drive the robot 1. Here, the time measuring unit 62 can measure the time length during which the operator does not operate the stick 52. When the time length during which the operator does not operate the stick 52 exceeds the predetermined determination value of the time length, the manual control unit 61 can perform control that prohibits the operation of the robot 1. That is, when the time during which the operator does not operate the stick 52 is long, the manual control unit 61 can perform control that prohibits the operation of the robot 1.

Alternatively, the manual control unit 61 can perform control that prohibits the operation of the robot 1 by operating the stick 52. For example, when the operator performs an operation for twisting the stick 52 in the R axis direction, the manual control unit 61 can perform control that prohibits the operation of the robot 1. When the operator resumes the operation of the robot 1, the operator can perform the operation of the stick 52 described above so that the manual control unit 61 permits the operation of the robot 1.

In the permission control of the present embodiment, a state in which the operation of the robot is permitted and a state in which the operation of the robot is prohibited can be switched by the operation device. For this reason, the operability of manual operation of the robot 1 is improved.

In addition, when the controller 4 is activated, immediately after performing the operation of the stick 52 so as to permit the operation of the robot 1, the type of control can be selected by the operation of the stick 52, such as the determining control for determining whether the inching operation described above is performed, or the movement direction control regarding the movement direction of the working tool. For example, immediately after the operation of the stick 52 is performed so as to permit the operation of the robot 1, when the stick 52 is pushed in the Z axis direction and tilted to the positive side of the X axis, the first control among the plurality of determination controls can be set so as to be performed. Alternatively, when the stick 52 is tilted on the negative side of the X axis while being pushed in the Z axis direction, the second control can be set so as to be performed. Alternatively, in a case where the stick 52 is pushed in the Z axis direction and is tilted on the positive side of the Y-axis, the third control can be set so as to be performed. In this way, a plurality of controls that are predetermined may be selected and performed by a continuous operation of the stick 52.

According to one aspect of the present disclosure, it is possible to provide a controller of a robot for performing manual operation with excellent operability.

The above embodiments can be combined as appropriate. In each of the above figures, the same or the like portions are denoted by the same reference numerals. Note that the above-described embodiments are merely examples and are not intended to limit the invention. Further, in the embodiments, modifications of the embodiment described in the claims are included.

The invention claimed is:

1. A controller of a robot, comprising:
an operation input device including a main body and a movable member supported by the main body portion, wherein the operation input device is arranged to permit an operator to perform an operation of manually changing a position and an orientation of the robot;
at least one processor configured to process an operation command from the operation input device in response to the operation of the operation input device; and
at least one storage; wherein,
the movable member is configured to perform a pushing operation, a pulling operation, and a tilting operation in a predetermined direction, and
the at least one processor is configured to:
upon the operator switching a control mode of the controller to an inching mode, manually control an inching operation for changing, based on the operation command generated during the operation of the operation input device, the position and the orientation of the robot by a predetermined minute amount to directly correspond to an operation direction and an operation amount of the movable member, and
store, in the at least one storage, one predetermined setting direction in which a working tool attached to the robot moves as a set value,
wherein after the operation of the operation input device to manually change the position and orientation of the robot, the inching operation is performed so as to move the working tool only in accordance with the predetermined setting direction of the set value such that any operation of the movable member in a direction different from the predetermined setting direction does not cause movement of the working tool,
wherein the at least one processor does not perform the inching operation when a level of a magnitude of force with which the movable member is operated by the user to manually change the position and the orientation of the robot and an elapsed time is less than a predetermined determination value, and performs the inching operation when the level of the magnitude of the force with which the movable member is operated by the user to manually change the position and the orientation of the robot and the elapsed time is greater than the predetermined determination value.

2. The controller of the robot according to claim 1, wherein,
the at least one storage stores a predetermined curved movement path along which the working tool moves, and
the at least one processor performs the inching operation for changing the position and the orientation of the robot such that the working tool moves along the movement path.

3. The controller of the robot according to claim 1, wherein,
the controller is configured to switch between an operation mode for operating the robot and a setting mode for setting at least one of a movement amount and a movement direction of a working tool attached to the robot, and
the at least one processor sets, in the setting mode, at least one of the movement amount and the movement direction of the working tool to correspond to a number of times that the movable member is operated.

4. The controller of the robot according to claim 1, wherein,
the controller is configured to switch between an operation mode for operating the robot and a setting mode for setting at least one of a movement amount and a movement direction of a working tool attached to the robot,
the at least one processor measures an elapsed time after the movable member is operated, and
in the setting mode, the at least one processor sets the movement direction based on a direction of a first time operation of the movable member, and sets the movement amount based on a time length of a second time operation of the movable member.

5. A controller of a robot, comprising:
an operation input device including a main body portion and a movable member supported by the main body portion, wherein the operation input device is arranged to permit an operator to perform an operation of manually changing a position and an orientation of the robot;
at least one processor configured to process an operation command from the operation input device in response to the operation of the operation input device, and
at least one storage; wherein,
the movable member is configured to perform a pushing operation, a pulling operation, and a tilting operation in a predetermined direction, and
the at least one processor is configured to:
upon the operator switching a control mode of the controller to an inching mode, manually control an inching operation for changing, based on the operation command generated during the operation of the operation input device, the position and the orientation of the robot by a predetermined minute amount to directly correspond to an operation direction and an operation amount of the movable member, and
store, in the at least one storage, a predetermined curved movement path along which a working tool attached to the robot moves and a predetermined movement length along the movement path in a single inching operation,
wherein after the operation of the operation input device to manually change the position and the orientation of the robot, the inching operation is performed so as to move the working tool only along the predetermined curved movement path by the predetermined movement along the movement length when the movable member is operated,
wherein the at least one processor does not perform the inching operation when a level of the magnitude of a force with which the movable member is operated by the user to manually change the position and the orientation of the robot and an elapsed time is less than a predetermined determination value, and performs the inching operation when the level of the magnitude of the force with which the movable member is operated by the user to manually change the position and the orientation of the robot and the elapsed time is greater than the predetermined determination value.

* * * * *